US012521995B2

(12) United States Patent
Hayashi et al.

(10) Patent No.: US 12,521,995 B2
(45) Date of Patent: Jan. 13, 2026

(54) CONTAINER INCLUDING CONTAINER BODY HAVING LIQUID SUPPLY OPENING POSITIONED BELOW COVER

(71) Applicant: BROTHER KOGYO KABUSHIKI KAISHA, Nagoya (JP)

(72) Inventors: Masahiro Hayashi, Anjo (JP); Naoya Okazaki, Hashima (JP); Satoru Oki, Nagoya (JP); Yuma Tanabe, Nagoya (JP); Yuji Fukuta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 66 days.

(21) Appl. No.: 18/188,022

(22) Filed: Mar. 22, 2023

(65) Prior Publication Data

US 2023/0347655 A1 Nov. 2, 2023

(30) Foreign Application Priority Data

Apr. 28, 2022 (JP) ................................. 2022-074688

(51) Int. Cl.
*B41J 2/20* (2006.01)
*B41J 2/175* (2006.01)

(52) U.S. Cl.
CPC ............. *B41J 2/20* (2013.01); *B41J 2/17513* (2013.01); *B41J 2/1754* (2013.01); *B41J 2/17553* (2013.01); *B41J 2/17556* (2013.01)

(58) Field of Classification Search
CPC ........ B41J 2/20; B41J 2/17513; B41J 2/1754; B41J 2/17553; B41J 2/17556; B41J 2/17509; B41J 2/1752; B41J 2/17523; B41J 29/13
See application file for complete search history.

(56) References Cited

U.S. PATENT DOCUMENTS

2005/0134663 A1 6/2005 Sasaki et al.
2005/0146577 A1 7/2005 Sasaki et al.
2005/0146578 A1 7/2005 Takagi et al.
2005/0146579 A1 7/2005 Sasaki et al.
2005/0151812 A1 7/2005 Sasaki et al.
2005/0195225 A1 9/2005 Takagi et al.
2012/0182364 A1* 7/2012 Takeda ................. B41J 2/17506 347/85
2018/0178535 A1* 6/2018 Tomoguchi .......... B41J 2/17523

FOREIGN PATENT DOCUMENTS

JP 2000-309108 A 11/2000
JP 2005-246781 A 9/2005
JP 2009056693 A * 3/2009 .......... B41J 2/17559
JP 2013-49164 A 3/2013
JP 2018-103565 A 7/2018

* cited by examiner

*Primary Examiner* — Justin Seo
(74) *Attorney, Agent, or Firm* — Merchant & Gould P.C.

(57) ABSTRACT

A container includes a container body, and a cover attached to the container body. The container body includes a front wall, a rear wall, and a liquid channel. The container body has a storage chamber in fluid communication with the liquid channel and positioned between the front wall and the rear wall in a front-rear direction. The liquid channel extends in the front-rear direction to have a supply opening that is open on the front wall and that is open frontward. The cover has an opening that is open rearward and the cover covers least a part of an outer surface of the front wall. The supply opening of the container body is positioned below a lower end of the opening of the cover.

13 Claims, 4 Drawing Sheets

CONTAINER INCLUDING CONTAINER BODY HAVING LIQUID SUPPLY OPENING POSITIONED BELOW COVER

REFERENCE TO RELATED APPLICATIONS

This application claims priority from Japanese Patent Application No. 2022-074688 filed on Apr. 28, 2022. The entire content of the priority application is incorporated herein by reference.

BACKGROUND ART

An ink cartridge attachable to a printer has been known in the art. The ink cartridge includes a cartridge body and a cover positioned at the front side of the cartridge body in an attachment direction of the ink cartridge. The cover has a through-hole through which an ink supply portion is exposed to an outside of the cartridge body.

DESCRIPTION

In the above ink cartridge, ink that flows out of the ink supply portion may adhere to the cover. Conceivably, the ink adhered to the cover may contaminate the interior of the printer and/or a recording sheet.

In view of the foregoing, it is an object of the present disclosure to provide a container capable of restraining liquid (as a recording material) flowing out of a supply opening from adhering to a cover of the container.

In order to attain the above and other object, according to one aspect, the present disclosure provides a container attachable to an image-forming apparatus. The container includes: a container body having a storage chamber configured to store liquid; and a cover attached to the container body. The container body includes: a front wall extending in an up-down direction; a rear wall facing the front wall in a front-rear direction crossing the up-down direction; and a liquid channel in fluid communication with the storage chamber. The storage chamber is positioned between the front wall and the rear wall in the front-rear direction. The liquid channel extends in the front-rear direction and has a supply opening that is open on the front wall. The supply opening is open frontward. The cover has an opening that is open rearward. The cover covers at least a part of an outer surface of the front wall of the container body. The supply opening of the container body is positioned below a lower end of the opening of the cover in the up-down direction.

With this structure, a front portion of the container body is protected by the cover. Further, adhesion of the liquid flowing out of the supply opening to the cover can be restrained, since the supply opening is positioned below the lower end of the opening of the cover. Further, the liquid adhered to a lower portion of the container body lower than the cover can be easily wiped out.

According to another aspect, the disclosure also provides a cover attachable to a container body having a storage chamber configured to store liquid. the container body having a supply opening that is open on an outer surface of the container body. The cover includes a front wall, an upper wall, a lower wall, a left wall, and a right wall. The upper wall extends in a front-rear direction from an upper end of the front wall. The lower wall extends in the front-rear direction from a lower end of the front wall. The left wall and right wall extend in an up-down direction crossing the front-rear direction to connect the upper wall to the lower wall. The upper wall, the lower wall, the left wall, and the right wall define an opening facing the front wall in the front-rear direction. The lower wall of the cover is positioned above the supply opening of the container body in the up-down direction.

With this structure, the cover can protect a front portion of the container body. Further, adhesion of the liquid flowing out of the supply opening to the cover can be restrained, since the supply opening is positioned below the lower wall of the cover. Further, the liquid adhered to a lower portion of the container body lower than the cover can be easily wiped out.

ONE EMBODIMENT

Figure 1:
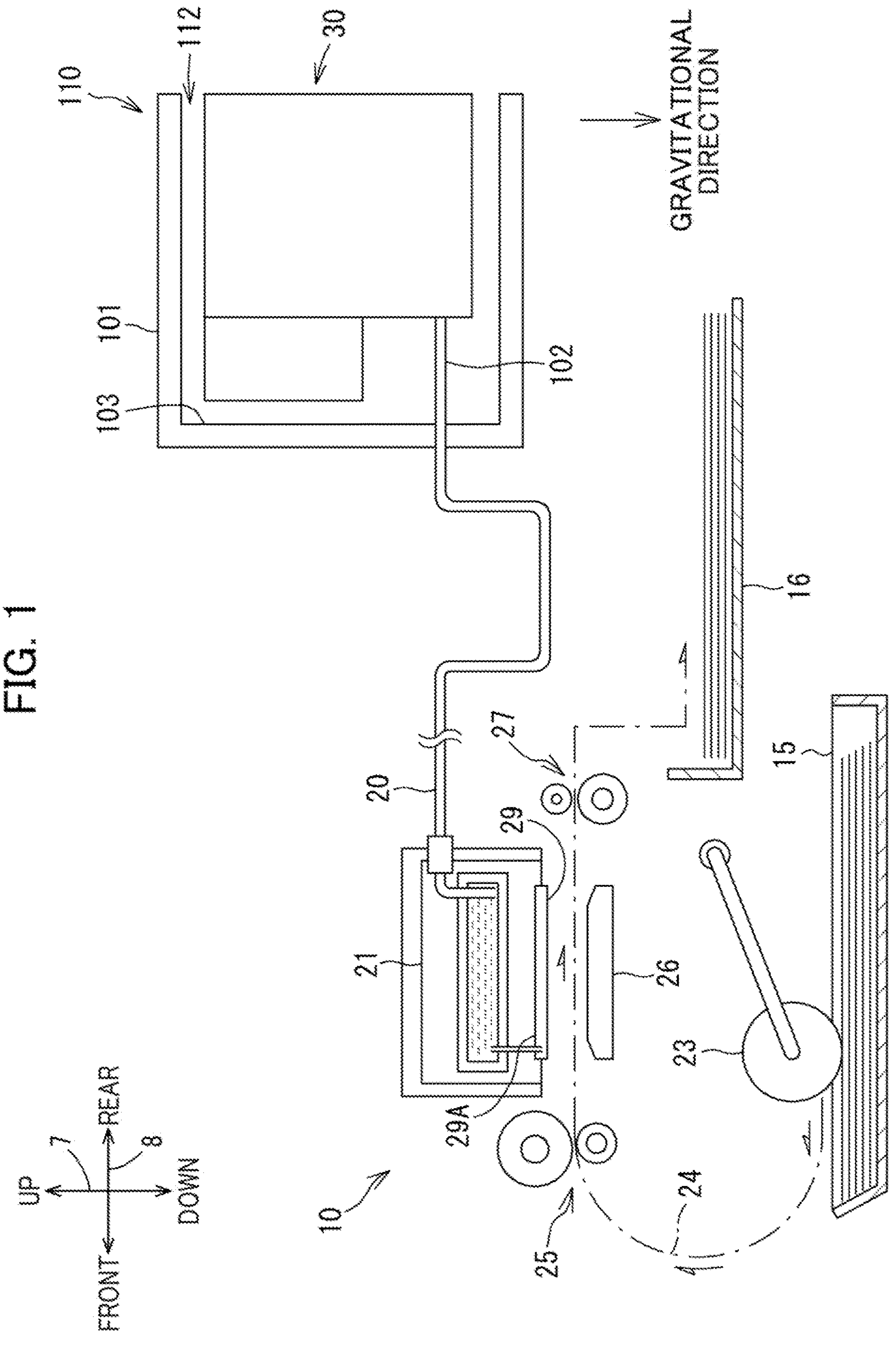
FIG. 1 is a schematic vertical cross-sectional view illustrating an internal structure of a printer 10.

Hereinafter, an ink cartridge 30 according to one embodiment of the present disclosure will be described with reference to the accompanying drawings.

In the following description, the ink cartridge 30 is assumed to be inserted in and removed from a cartridge receiving portion 110 of a printer 10 in a horizontal direction (a direction perpendicular to the gravitational direction). Hence, a front-rear direction 8 and a left-right direction 9 with respect to the ink cartridge 30 will be referred to as being horizontal. Still however, the front-rear direction 8 need not be horizontal. Further, an up-down direction 7 will be defined as a vertical direction perpendicular to the front-rear direction 8. Also, the left-right direction 9 will be defined as a direction perpendicular to the up-down direction 7 and the front-rear direction 8.

Incidentally, a state where the ink cartridge 30 is accommodated in the cartridge receiving portion 110 and is actually used implies a state that the ink cartridge 30 has been inserted in the cartridge receiving portion 110 to be placed at an attached position therein. In the attached position of the ink cartridge 30, an ink needle 102 provided in the cartridge receiving portion 110 is inserted in an ink supply opening 47 of the ink cartridge 30 such that the ink needle 102 and the ink supply opening 47 are connected to each other. Further, in the following description, a posture of the ink cartridge 30 accommodated in the cartridge receiving portion 110 to be used thereby will be referred to as "operational posture" of the ink cartridge 30.

Further, in the following description, a frontward direction implies the direction of insertion of the ink cartridge 30 into the cartridge receiving portion 110, and a rearward direction implies the direction of removal of the ink cartridge 30 from the cartridge receiving portion 110 with respect to the front-rear direction 8. Further, throughout the description, "facing frontward" implies facing in a direction including a component of the frontward direction, and "facing rearward" implies facing in a direction including a component of the rearward direction. Further, "facing downward" implies facing in a direction including a component of the downward direction, and "facing upward" implies facing in a direction including a component of the upward direction. For example, "front surface faces frontward" implies not only that the front surface faces frontward, but also that the front surface faces in a direction slanting relative to the frontward direction.

<Outline of Printer 10>

As illustrated in FIG. 1, the printer 10 is an image-forming apparatus configured to form an image on a sheet by ejecting ink droplets thereon based on an inkjet recording scheme. The printer 10 may be an ink jet printer, for example. The printer 10 includes the cartridge receiving portion 110, a recording head 21, and an ink tube 20.

The cartridge receiving portion 110 is configured to receive the ink cartridge 30 according to the embodiment. The cartridge receiving portion 110 has one end face formed with an opening 112. The ink cartridge 30 can be inserted frontward into the cartridge receiving portion 110 through the opening 112, and the ink cartridge 30 can be pulled out rearward from the cartridge receiving portion 110 through the opening 112.

Incidentally, FIG. 1 depicts a state where the ink cartridge 30 has been completely accommodated in the cartridge receiving portion 110. That is, in FIG. 1, the ink cartridge 30 is in an attached state thereof. The ink cartridge 30 illustrated in FIG. 1 (in the attached state) is in the operational posture.

The ink cartridge 30 stores liquid therein, specifically, ink to be used in the printer 10. In the attached state of the ink cartridge 30 to the cartridge receiving portion 110, the ink cartridge 30 and the recording head 21 are connected to each other through the ink tube 20. The recording head 21 is configured to eject the ink supplied from the ink cartridge 30 through a plurality of nozzles 29. Specifically, a head control board (not illustrated) provided in the recoding head 21 is configured to selectively apply a driving voltage to a plurality of piezoelectric elements 29A each corresponding to each nozzle 29 to eject the ink through the selected nozzles 29. That is, the recording head 21 is configured to consume the ink stored in the ink cartridge 30 attached to the cartridge receiving portion 110.

The printer 10 also includes a sheet supply tray 15, a pick-up roller 23, a sheet conveying passage 24, a pair of conveying rollers 25, a platen 26, a pair of discharge rollers 27, and a sheet discharge tray 16. The pick-up roller 23 is configured to feed one sheet on the sheet supply tray 15 onto the sheet conveying passage 24. The sheet conveyed to the sheet conveying passage 24 then reaches the pair of conveying rollers 25. The pair of conveying rollers 25 is then configured to convey the sheet to the platen 26. The recording head 21 selectively ejects the ink onto the sheet while the sheet moves along the platen 26, to form an image on the sheet. The sheet having moved past the platen 26 is then conveyed to the pair of discharge rollers 27. The pair of discharge rollers 27 is configured to discharge the sheet onto the discharge tray 16 which is positioned most downstream in the conveying passage 24.

Cartridge Receiving Portion 110

As illustrated in FIG. 1, the cartridge receiving portion 110 includes a casing 101 and the ink needle 102. The ink cartridge 30 can be accommodated in the cartridge receiving portion 110.

As illustrated in FIG. 1, the casing 101 has a box-like shape constituting a housing of the cartridge receiving portion 110. The opening 112 can be exposed to a user interface surface of the printer 10 that a user faces when the user uses the printer 10.

The ink needle 102 is tubular in shape and is positioned at a lower end portion of an end wall 103 of the casing 101, the end wall 103 facing the opening 112 in the front-rear direction 8. The ink needle 102 is provided at the end wall 103 at a position in alignment with the ink supply opening 47 (see FIG. 3) of the ink cartridge 30 attached to the cartridge receiving portion 110. The ink needle 102 protrudes rearward from the end wall 103 of the casing 101 to have a protruding end (tip end) that is open rearward. The tip end of the ink needle 102 may be a flattened tip or may be a pointed tip.

<Ink Cartridge 30>

Figure 2:
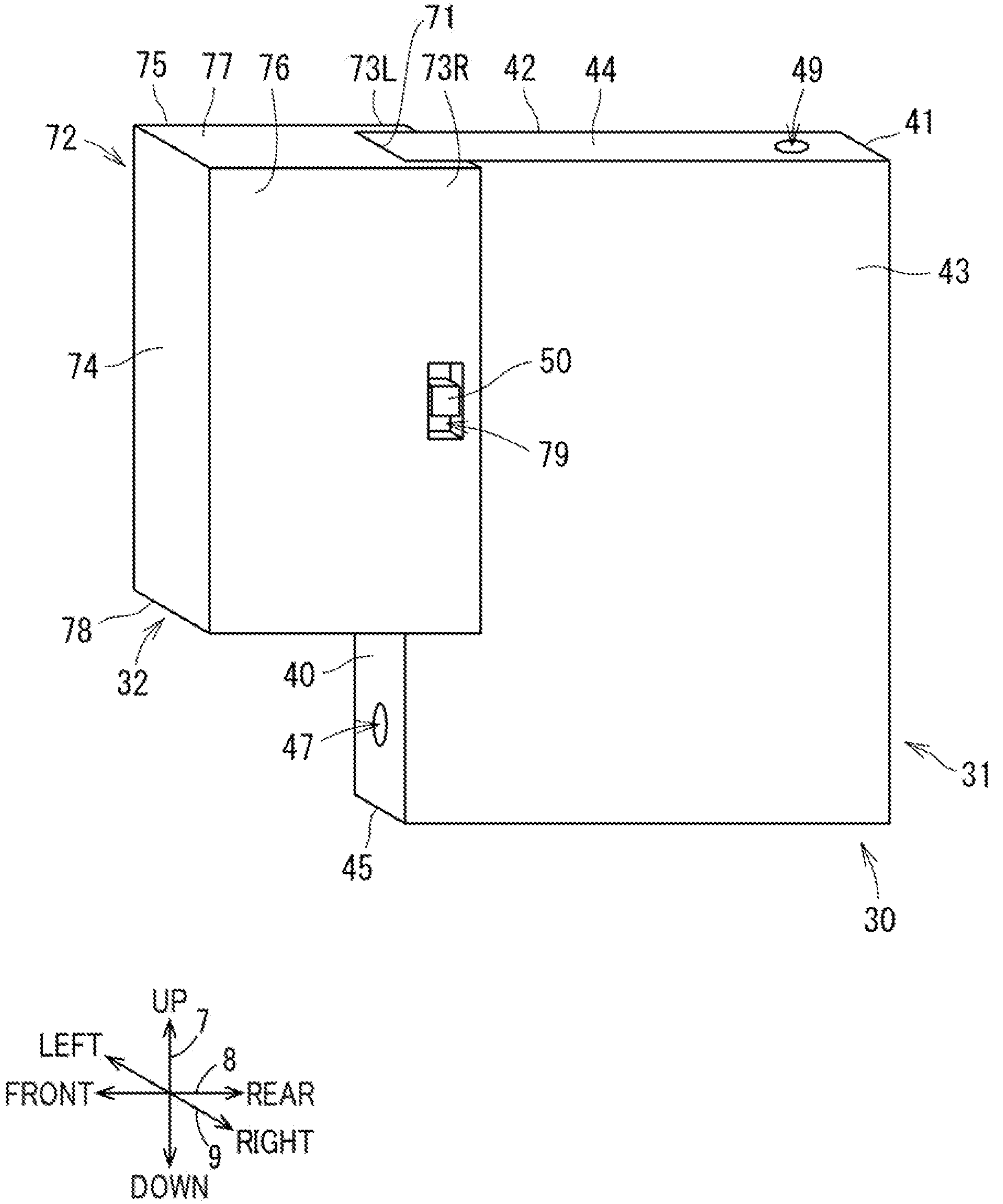
FIG. 2 is a perspective view of an ink cartridge 30 according to one embodiment.

The ink cartridge 30 is a container configured to store ink as liquid. As illustrated in FIG. 2, the ink cartridge 30 includes a container body 31 and a cover 32.

As illustrated in FIG. 2, the container body 31 has a generally flat rectangular parallelepiped shape whose dimension in the left-right direction 9 is smaller than dimensions thereof in the up-down direction 7 and front-rear direction 8.

The container body 31 includes: a front wall 40; a rear wall 41 opposite the front wall 40 in the front-rear direction 8; a left wall 42 connecting the front wall 40 to the rear wall 41; a right wall 43 opposite to the left wall 42 in the left-right direction 9; an upper wall 44 connecting the front wall 40 to the rear wall 41; and a lower wall 45 opposite to the upper wall 44 in the up-down direction 7. The front wall 40 has an outer surface facing frontward. The rear wall 41 has an outer surface facing rearward. The left wall 42 has an outer surface facing leftward. The right wall 43 has an outer surface facing rightward. The upper wall 44 has an outer surface facing upward. The lower wall 45 has an outer surface facing downward.

The front wall 40, the rear wall 41, the left wall 42, the right wall 43, the upper wall 44 and the lower wall 45 define in combination a storage chamber 46 which is an internal space of the container body 31. The front wall 40, the rear wall 41, the left wall 42, the right wall 43, the upper wall 44, and the lower wall 45 have a translucency to enable a user to visually recognize a level of the ink stored in the storage chamber 46. The container body 31 is, for example, a molded product made from synthetic resin.

The ink supply opening 47 is positioned at a lower end portion of the front wall 40 to allow the ink in the storage chamber 46 to flow out therefrom through the ink supply opening 47. In the present embodiment, the ink supply opening 47 is open to an outside of the container body 31. However, the ink supply opening 47 may be configured to be opened or closed by a value, for example. The ink supply opening 47 is open frontward.

Figure 3:
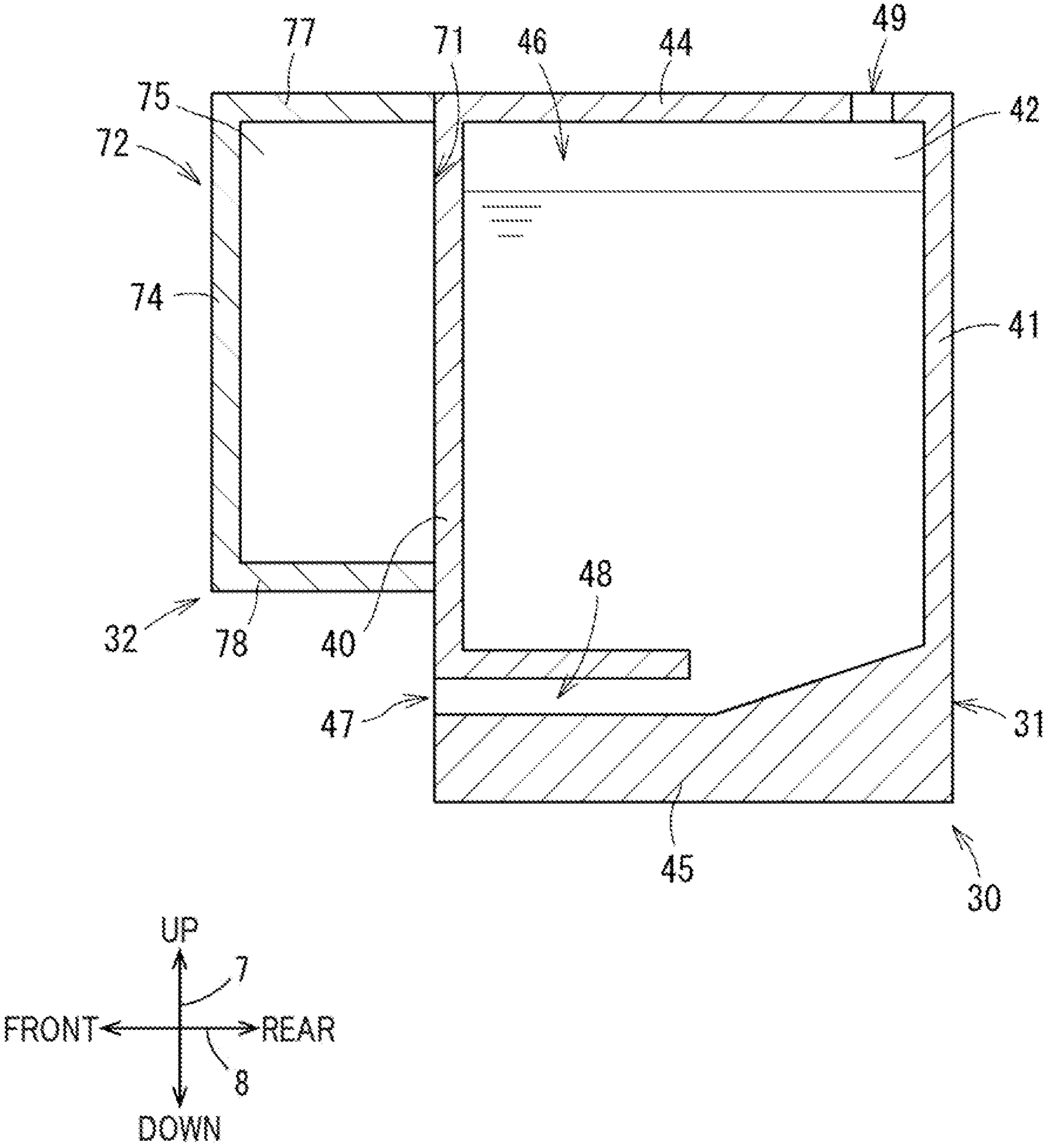
FIG. 3 is a vertical cross-sectional view of the ink cartridge 30 according to the one embodiment.

As illustrated in FIG. 3, inside the container body 31, an ink channel 48 is provided to extend in the front-rear direction 8 from the ink supply opening 47. The ink channel 48 connects the ink supply opening 47 to a bottom end region of the storage chamber 46. That is, the ink channel 48 has a front end serving as the ink supply opening 47. The ink stored in the storage chamber 46 can flow into the ink channel 48 and is configured to be discharged to the outside through the ink supply opening 47.

The upper wall 44 is formed with an air communication port 49 to provide communication between an upper end region (air layer) of the storage chamber 46 and an atmosphere. The storage chamber 46 can communicate with the atmosphere through the air communication port 49. Accordingly, due to the air flow through the air communication port 49, the air layer in the storage chamber 46 can become the atmospheric pressure. The air communication port 49 is open on the outer surface of the upper wall 44 to face upward. Incidentally, the air communication port 49 may be closed by a valve or a semipermeable membrane.

As illustrated in FIG. 2, a protrusion 50 is provided on the outer surface of the right wall 43 at a position near a front end thereof. The protrusion 50 protrudes rightward from the outer surface of the right wall 43. Similarly, although not illustrated in the drawings, another protrusion 50 is also provided on the outer surface of the left wall 42 at a front end thereof to protrude leftward therefrom.

The cover 32 has a rectangular parallelepiped shape whose size is smaller than the size of the container body 31. The cover 32 has an opening 71 that faces rearward. The cover 32 is assembled to the container body 31 such that the cover 32 covers a part of the front wall 40, the part being above the ink supply opening 47.

The cover 32 includes a cover body 72 and extension walls 73L, 73R.

The cover body 72 has a box-like shape having the opening 71 facing rearward. The cover body 72 includes a front wall 74, a left wall 75, a right wall 76, an upper wall 77 and a lower wall 78. The left wall 75 extends rearward from a left end of the front wall 74. The right wall 76 extends rearward from a right end of the front wall 74 and faces the left wall 75 in the left-right direction 9. The upper wall 77 extends rearward from an upper end of the front wall 74. The lower wall 78 extends rearward from a lower end of the front wall 74 and faces the upper wall 77 in the up-down direction 7.

The front wall 74 has an outer surface facing frontward. The left wall 75 has an outer surface facing leftward. The right wall 76 has an outer surface facing rightward. The upper wall 77 has an outer surface facing upward. The lower wall 78 has an outer surface facing downward. The front wall 74, the left wall 75, the right wall 76, the upper wall 77, and the lower wall 78 define in combination an internal space of the cover body 72. The opening 71 is defined by rear ends of the left wall 75, the right wall 76, the upper wall 77, and the lower wall 78.

The cover body 72 has a dimension in the up-down direction 7 smaller than the dimension of the container body 31 in the up-down direction 7. The cover body 72 has a dimension in the front-rear direction 8 smaller than the dimension of the container body 31 in the front-rear direction 8. The cover body 72 has a dimension in the left-right direction 9 slightly greater than the dimension of the container body 31 in the left-right direction 9.

The extension wall 73R extends rearward from the rear end of the right wall 76. The extension wall 73R has a flat plate-like shape. The extension wall 73R has a center portion in the up-down direction 7 formed with a through-hole 79. The through-hole 79 penetrates through the extension wall 73R in the left-right direction 9. The protrusion 50 of the right wall 43 of the container body 31 is inserted in the through-hole 79 for engagement therewith. The through-hole 79 has a rectangular shape whose size is greater than an outer profile of the protrusion 50 in a side view. Specifically, the through-hole 79 has a dimension in the up-down direction 7 greater than a dimension thereof in the front-rear direction 8. The dimension of the through-hole 79 in the up-down direction 7 is far greater than the dimension in the up-down direction 7 of the corresponding protrusion 50 on the right wall 43 of the container body 31. Accordingly, the protrusion 50 can move in the up-down direction 7 within the through-hole 79 relative to the cover 32 in a state where the protrusion 50 is inserted in the through-hole 79.

The extension wall 73L extends rearward from the rear end of the left wall 75. The extension wall 73L has a configuration the same as that of the extension wall 73R. That is, another through-hole 79 is formed in a center portion of the extension wall 73L in the up-down direction 7, although not shown in the drawings. The protrusion 50 on the left wall 42 of the container body 31 is inserted in the through-hole 79 of the extension wall 73L for engagement therewith.

The extension wall 73L and extension wall 73R oppose each other with a front end portion of the container body 31 inserted therebetween. The cover 32 is attached to the container body 31 by: the insertion of the protrusion 50 of the left wall 42 in the through-hole 79 of the extension wall 73L; and by the insertion of the protrusion 50 of the right wall 43 in the through-hole 79 of the extension wall 73R. In the attached state of the cover 32 to the container body 31, the cover 32 is movable relative to the container body 31 in the up-down direction 7 to such a degree that the protrusions 50 can move within the corresponding through-holes 79 in the up-down direction 7 relative to the cover 32.

In the attached state of the cover 32 to the container body 31, the cover 32 covers a part of the front wall 40, i.e., an upper end portion pf the front wall 40 of the container body 31. In this state, the outer surface of the front wall 74 of the cover 32 is positioned frontward of the ink supply opening 47; and the ink supply opening 47 is positioned below the lower end of the opening 71 of the cover 32.

Technical Advantages of the Embodiment

According to the above-described embodiment, the front end portion of the container body 31 is protected by the cover 32. Further, adhesion of ink flowing out of the ink supply opening 47 to the cover 32 can be restrained, since the ink supply opening 47 is positioned below the lower end of the opening 71 of the cover 32. Further, a user can easily wipe ink adhered to a lower portion of the container body 31 below the cover 32.

Further, the level of the ink stored in the storage chamber 46 can be visually recognized from the outside of the container body 31, since the left wall 42 and the right wall 43 of the container body 31 have translucency capable of transmitting light.

Further, the cover 32 can restrict an external member from contacting the ink supply opening 47, since the outer surface of the front wall 74 of the cover 32 is positioned frontward of the ink supply opening 47.

[Modifications]

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification

Figure 4:
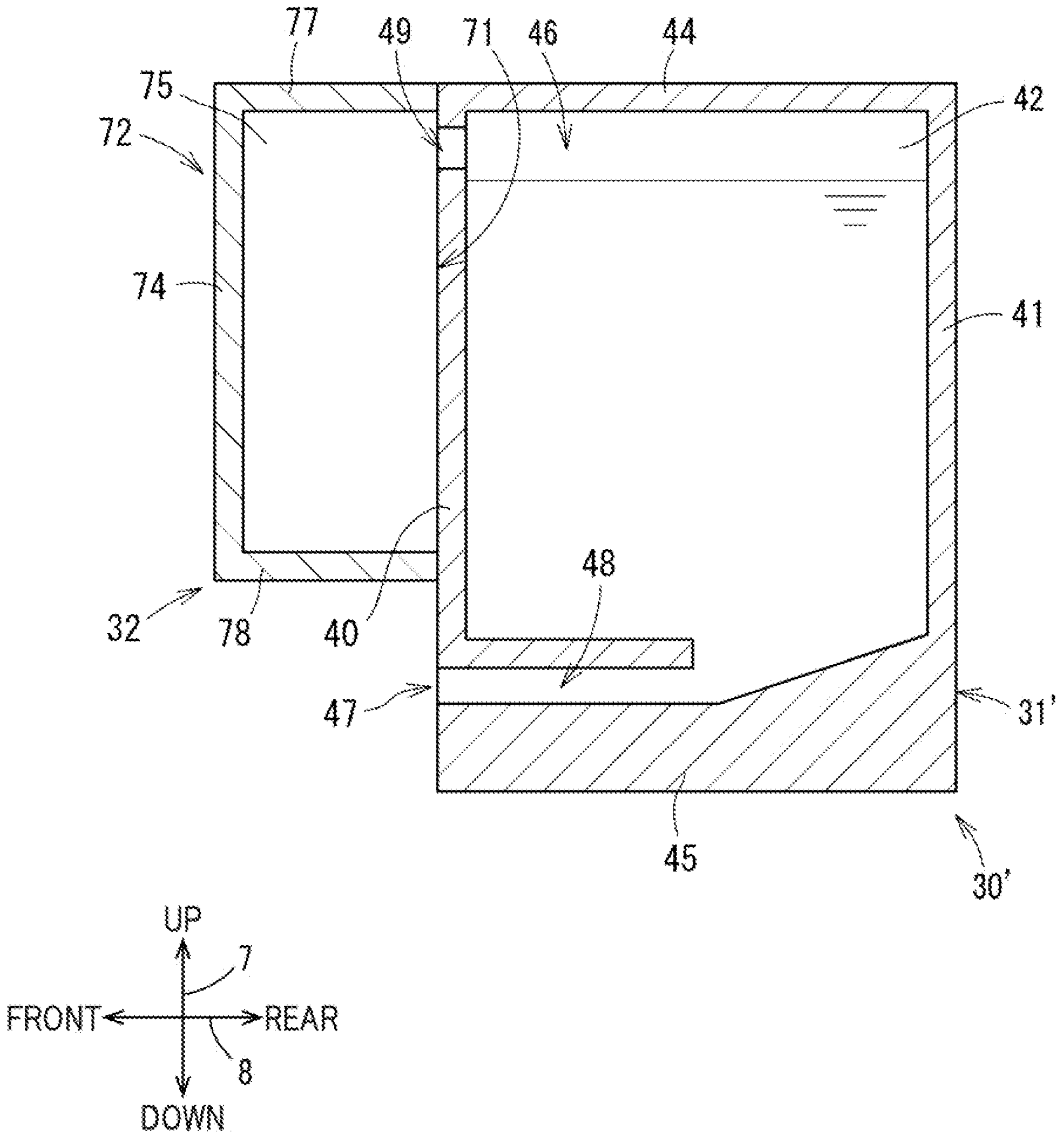
FIG. 4 is a vertical cross-sectional view of an ink cartridge 30' according to a first modification to the one embodiment.

According to the above-described embodiment, the air communication port 49 is formed in the upper wall 44 of the container body 31. However, the air communication port 49 need not be formed in the upper wall 44. As an example, FIG. 4 illustrates an ink cartridge 30' according to a first modification to the embodiment. In the ink cartridge 30' according to the first modification, the air communication port 49 is formed in the front wall 40 of a container body 31'. That is, in this modification, the air communication port 49 is open frontward on the outer surface of the front wall 40. Further, the opening of the air communication port 49 is covered by the cover 32.

Here assume that the ink cartridge 30' according to the first modification is placed in such a posture that the ink supply opening 47 faces downward, that is, the outer surface of the front wall 40 of the cartridge body 31' faces downward in the gravitational direction. Compared to a case where the ink cartridge 30 according to the embodiment (whose air communication port 49 is formed in the upper wall 44) is placed in the same manner, there is smaller difference in position between the ink supply opening 47 and the air communication port 49 in the ink cartridge 30' with respect to the gravitational direction (up-down direction 7). Accordingly, ink pressure at the ink supply opening 47 is lower in the ink cartridge 30' than in the ink cartridge 30. Hence, leakage of the ink stored in the storage chamber 46 through the ink supply opening 47 is less likely to occur in the ink cartridge 30' in this posture. As a result, the outer surface of the cartridge body 31' of the ink cartridge 30' is less likely to get contaminated from the leaked ink.

Other Variations

In the above-described embodiment, the ink supply opening 47 is positioned in the front wall 40 of the cartridge body 31. As a variation, an ink supply portion protruding frontward from the front wall 40 may be provided, and the ink channel 48 may be formed inside the ink supply portion such that the ink supply portion has a tip end formed with the ink supply opening 47.

Further, the cartridge body 31 and the cover 32 may have outer shapes other than the rectangular parallelepiped or box-like shape. For example, the cartridge body 31 may have a convex portion to be operated by a user, or may have a detecting portion configured to detect the ink stored in the storage chamber 46. Likewise, the cover 32 may have a similar convex portion and/or a similar detecting portion.

In the above-described embodiment, the cover 32 is attached to the container body 31 by the insertion of the protrusions 50 of the container body 31 in the through-holes 79 of the cover 32. However, other structures may be applied for the attachment of the cover 32 to the container body 31.

In the above-described embodiment, ink is stored in the container body 31 as a recording material. However, the container body 31 may store a recording material other than ink, such as pretreatment liquid configured to be ejected onto the sheet prior to printing with ink.

[Remarks]

The ink cartridge 30 is an example of a container. The container body 31, 31' is an example of a container body. The cover 32 is an example of a cover. The front wall 40 is an example of a front wall. The rear wall 41 is an example of a rear wall. The ink channel 48 is an example of a liquid channel. The storage chamber 46 is an example of a storage chamber. The ink supply opening 47 is an example of a supply opening. The opening 71 is an example of an opening of the cover. The left wall 42 is an example of a first side wall of the container body, and the right wall 43 is an example of a second side wall of the container body. The upper wall 44 is an example of an upper wall of the container body, and the lower wall 45 is an example of a lower wall of the container body. The air communication port 49 is an example of an air communication passage. The front wall 74 is an example of a front wall of the cover. The upper wall 77 is an example of an upper wall of the cover, and the lower wall 78 is an example of a lower wall of the cover. The left wall 75 and right wall 76 are examples of a left wall and a right wall of the cover, respectively. The through-hole 79 is an example of a through-hole in each of the left and right walls of the cover. The protrusion 50 is an example of a protrusion of the container body.

What is claimed is:

1. A container comprising:

a container body having a storage chamber configured to store liquid, the container body comprising:

a front wall extending in an up-down direction;

a rear wall facing the front wall in a front-rear direction crossing the up-down direction, the storage chamber being positioned between the front wall and the rear wall in the front-rear direction; and a liquid channel in fluid communication with the storage chamber, the liquid channel extending in the front-rear direction and having a supply opening that is open on the front wall, the supply opening being open frontward; and a cover attached to the container body, the cover having an opening that is open rearward, the cover covering at least a part of an outer surface of the front wall, the supply opening of the container body being positioned below a lower end of the opening of the cover in the up-down direction, wherein the cover is attached to the container body such that the cover is movable relative to the container body in the up-down direction.

2. The container according to claim 1, wherein the container body has translucency to allow a level of the liquid stored in the storage chamber to be visually recognized from an outside of the container body.

3. The container according to claim 1, wherein the cover has a front surface positioned frontward relative to the supply opening in the front-rear direction.

4. The container according to claim 3, wherein the cover includes a lower wall connected to the front surface, the lower wall defining a lower end of the cover in the up-down direction, and, wherein the lower wall is positioned above the supply opening in the up-down direction.

5. The container according to claim 1, wherein the container body further comprises:

a first side wall connecting the front wall to the rear wall;

a second side wall facing the first side wall in a left-right direction crossing the front-rear direction and the up-down direction;

an upper wall connecting the front wall to the rear wall and also connecting the first side wall to the second side wall; and a lower wall facing the upper wall in the up-down direction, the lower wall connecting the front wall to the rear wall and also connecting the first side wall to the second side wall.

6. The container according to claim 5, wherein the liquid channel is formed in the lower wall.

7. The container according to claim 1, wherein the container body has an air communication passage configured to allow the storage chamber to communicate with an atmosphere, the air communication passage being open on an outer surface of the container body to provide an opening facing frontward in the front-rear direction.

8. The container according to claim 7, wherein the air communication passage is formed in the front wall to be open on the outer surface of the front wall, and wherein the cover covers the opening of the air communication passage.

9. The container according to claim 1, wherein the container body has an air communication passage configured to allow the storage chamber to communicate with an atmosphere, the air communication passage being open on an outer surface of the container body to provide an opening facing upward in the up-down direction.

10. The container according to claim 9, wherein the container body further comprises:

an upper wall extending in the front-rear direction to connect the front wall to the rear wall, the air communication passage being open on an outer surface of the upper wall.

11. A cover attachable to a container body having a storage chamber configured to store liquid, the container body having a supply opening that is open on an outer surface of the container body, the cover comprising:

a front wall;

an upper wall extending in a front-rear direction from an upper end of the front wall;

a lower wall extending in the front-rear direction from a lower end of the front wall; and a left wall and a right wall extending in an up-down direction crossing the front-rear direction to connect the upper wall to the lower wall, wherein the upper wall, the lower wall, the left wall, and the right wall define an opening facing the front wall in the front-rear direction, and wherein the lower wall of the cover is positioned above the supply opening of the container body in the up-down direction, and wherein the cover is attached to the container body such that the cover is movable relative to the container body in the up-down direction.

12. The cover according to claim 11, wherein the front wall is positioned frontward relative to the supply opening of the container body in the front-rear direction when the cover is attached to the container body.

13. The cover according to claim 11. wherein each of the left wall and the right wall has a through-hole engageable with a protrusion protruding from the container body, and the through-hole has a dimension in the up-down direction that is larger than a dimension in the up-down direction of the protrusion.

* * * * *